US006447437B1

(12) United States Patent
Lee et al.

(10) Patent No.: US 6,447,437 B1
(45) Date of Patent: Sep. 10, 2002

(54) METHOD FOR REDUCING $CO_2$, CO, NOX, AND $SO_X$ EMISSIONS

(75) Inventors: James Weifu Lee, Oak Ridge, TN (US); Rongfu Li, Zhejiang (CH)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/540,382

(22) Filed: Mar. 31, 2000

(51) Int. Cl.[7] .............................................. C05D 11/00
(52) U.S. Cl. ..................... 588/250; 588/252; 405/129.1; 71/61; 71/63; 423/354; 423/359; 423/220; 423/420
(58) Field of Search ............................... 423/354, 359, 423/362, 220, 226, 244.1, 420, 422; 71/61, 63; 588/252, 261, 250; 405/129.1

(56) References Cited

U.S. PATENT DOCUMENTS

| | | | | |
|---|---|---|---|---|
| 1,453,069 A | * | 4/1923 | Gaus et al. ................... | 564/66 |
| 3,661,719 A | * | 5/1972 | Kelmar ........................ | 201/17 |
| 3,904,743 A | * | 9/1975 | Urban ........................ | 423/567.1 |
| 4,101,634 A | * | 7/1978 | Ploeg ........................ | 423/239.1 |
| 4,133,671 A | * | 1/1979 | Mikel .......................... | 71/54 |
| 4,197,281 A | * | 4/1980 | Muenger et al. ........... | 423/369 |
| 4,247,321 A | * | 1/1981 | Persinger ..................... | 71/59 |
| 4,571,256 A | * | 2/1986 | Takagi et al. ................ | 71/28 |
| 5,834,722 A | * | 11/1998 | Tokunaga et al. ......... | 204/157.3 |
| 5,958,353 A | * | 9/1999 | Eyal ............................ | 423/234 |
| 6,162,409 A | * | 12/2000 | Skelley et al. ............ | 423/239.1 |

FOREIGN PATENT DOCUMENTS

| | | |
|---|---|---|
| CH | 94110620 | 12/1995 |
| DE | 3841157 A1 * | 6/1990 |
| EP | 0 024 061 | 2/1981 |
| JP | 10-263390 A * | 10/1998 |
| WO | WO-99/54662 A1 * | 10/1999 |

OTHER PUBLICATIONS

Lee, J.W., et al., "Molecular ionic probes: a new class of Hill reagents and their potential for nanofabrication and biometallocatalysis," J. Phys., Chem., 102:2095–2100(1998).

(List continued on next page.)

Primary Examiner—David Bagnell
Assistant Examiner—John Kreck
(74) Attorney, Agent, or Firm—Akerman, Senterfitt & Eidson, P.A.

(57) ABSTRACT

Industrial combustion facilities are integrated with greenhouse gas-solidifying fertilizer production reactions so that $CO_2$, CO, $NO_x$, and $SO_x$ emissions can be converted prior to emission into carbonate-containing fertilizers, mainly $NH_4HCO_3$ and/or $(NH_2)_2CO$, plus a small fraction of $NH_4NO_3$ and $(NH_4)_2SO_4$. The invention enhances sequestration of $CO_2$ into soil and the earth subsurface, reduces $NO_3^-$ contamination of surface and groundwater, and stimulates photosynthetic fixation of $CO_2$ from the atmosphere. The method for converting $CO_2$, CO, $NO_x$, and $SO_x$ emissions into fertilizers includes the step of collecting these materials from the emissions of industrial combustion facilities such as fossil fuel-powered energy sources and transporting the emissions to a reactor. In the reactor, the $CO_2$, CO, $N_2$, $SO_x$, and/or $NO_x$ are converted into carbonate-containing fertilizers using $H_2$, $CH_4$, or $NH_3$. The carbonate-containing fertilizers are then applied to soil and green plants to (1) sequester inorganic carbon into soil and subsoil earth layers by enhanced carbonation of groundwater and the earth minerals, (2) reduce the environmental problem of $NO_3^-$ runoff by substituting for ammonium nitrate fertilizer, and (3) stimulate photosynthetic fixation of $CO_2$ from the atmosphere by the fertilization effect of the carbonate-containing fertilizers.

7 Claims, 5 Drawing Sheets

OTHER PUBLICATIONS

Blanco, J., et al., "Two–bed catalytic system for Nox/SOx removal," Catal. Today 42:85–92 (1998).

Lee, J.W., et al., "Bioelectronics and biometallocatalysis for production of fuels and chemicals by photosynthetic water splitting," Appl. Biochem. Biotechnol., 51/52:295–305 (1995).

Lee, J.W., "Photosynthetic water splitting: in situ photorecipitation of metallocatalysts for photoprevolution of hydrogen and oxygen," Energy Fuels 8(3):770–773 (1994).

Honti, G.D., "Production of ammonium nitrate," Fert. Sci. Technol. Ser., 4:197–223 (1985).

* cited by examiner

METHOD FOR REDUCING $CO_2$, CO, $NO_x$, AND $SO_x$ EMISSIONS

STATEMENT REGARDING FEDERALLY SPONSORED RESEARCH

This invention was made with United States Government support awarded by the Department of Energy to Lockheed Martin Energy Research Corporation, Contract No. DE-ACO5-96OR22464. The United States Government has certain rights in this invention.

CROSS-REFERENCE TO RELATED APPLICATIONS (Not Applicable)

BACKGROUND OF THE INVENTION

1. Field of the Invention

This invention relates generally to chemical, geological, and photosynthetic sequestration of $CO_2$, pollution control systems, and particularly to a method for removal of $CO_2$, CO, $NO_x$, and $SO_x$ emissions, for reduction of $NO_3^-$ contamination of surface water and groundwater, and for sequestration of inorganic carbon into soil and subsoil earth layers.

2. Description of the Relevant Art

The rise in anthropogenic greenhouse gas emissions, particularly $CO_2$, is attributed largely to the increased use of fossil fuels. Fossil fuels, particularly coal, oil, and natural gas, are the primary fuels of industrialized society. These fuels supply abundant energy at low cost. Currently 22 gigatons (Gt) of $CO_2$ per year (equivalent to 6 Gt C/yr) is emitted as a result of the use of fossil fuels. Coal is the fuel most widely used for the generation of electricity worldwide because it is readily available, easily transportable, and relatively inexpensive. Approximately 70% of all the electricity used in the United States is generated from coal and natural gas. Oil-derived products dominate transportation fuels. Worldwide, coal-fired power plants result in about 1.8 of the 6 Gt C/yr of $CO_2$ emissions. The remainder is from the use of fossil fuels in transportation, industry, and residences.

The increasing effects of $CO_2$ emissions and global warming have challenged the industrialized world to find new and better ways to meet the increasing need for energy while reducing greenhouse gases. A treaty recently negotiated in Kyoto, Japan, would require developed nations to reduce their emissions of greenhouse gases below 1990 levels by the year 2010. New strategies for economically controlling the emissions of greenhouse gases are therefore required.

The process of photosynthesis removes more $CO_2$ from the atmosphere than any other reaction. Each year, land-based green plants remove about 403 Gt $CO_2$ (equivalent to 110 Gt C) from the atmosphere and the oceans draw approximately 385 Gt $CO_2$ as well. An enhancement as small as 6% for terrestrial or ocean photosynthesis is sufficient to remove 22 Gt $CO_2$ (6 Gt C), or the entire amount of $CO_2$ emitted into the atmosphere annually from the use of fossil fuels. The requirements of the recent Kyoto Treaty could be satisfied by an increase of only 0.62% in annual global photosynthetic biomass production, if the increased biomass is in a stable form such as woody products.

In many parts of the world, land-based photosynthesis in the form of crop production is limited by the lack of fertilizers. Nitrogen in the form of ammonium, $NH_4^+$, is the most-needed fertilizer since it is an essential substrate for the synthesis of all amino acids—and thus proteins, chlorophyll, and many lipid molecules of membranes. All are important components of photosynthetic membranes. An increase in the use of fertilization can dramatically enhance photosynthetic activity by stimulating more green plants to grow. This would result in the capture of more sunlight energy and the fixation of more $CO_2$. A more abundant supply of environmentally friendly fertilizers and appropriate fertilization of trees can be a positive contribution to global $CO_2$ sequestration.

SUMMARY OF THE INVENTION

According to the invention, industrial combustion facilities can be integrated with greenhouse gas-solidifying fertilizer production reactions so that $CO_2$, CO, $NO_x$, and $SO_x$ emissions are converted into carbonate-containing fertilizers, primarily $NH_4HCO_3$ and $(NH_2)_2CO$, that can enhance the sequestration of $CO_2$ into soil and the earth subsurface, reduce the problem of $NO_3^-$ runoff, and stimulate photosynthetic fixation of $CO_2$ from the atmosphere. Therefore, $CO_2$ emission sources, such as from a fossil fuel-fired power plant, are directed to a reactor before they can be emitted through smokestacks. In the reactor, $CO_2$ is converted to at least one selected from the group consisting of $NH_4HCO_3$ and $(NH_2)_2CO$. The $NH_4HCO_3$ and/or $(NH_2)_2CO$ is then applied into soil to enhance carbonization of soil and subsoil earth layers and to stimulate photosynthetic fixation of $CO_2$ from the atmosphere.

The production of $NH_4HCO_3$ and $(NH_2)_2CO$ is summarized by the reactions:

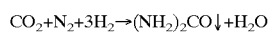

Methane ($CH_4$) and/or carbon monoxide (CO) can be utilized instead of hydrogen gas according to the following reactions:

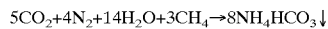

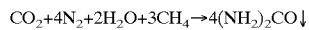

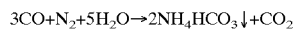

The invention is also useful for removing $NO_x$ and $SO_x$ emissions by the following reaction pathway:

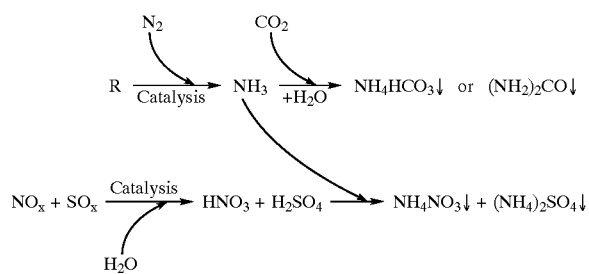

wherein R is at least one selected from the group consisting of CO, $H_2$ and $CH_4$.

Catalysts are used to catalyze the reactions of the invention. Preferred catalysts include, but are not limited to, nanometer-structured and/or hybridized metallocatalysts of Ru, Os, W, Fe, Pt, Pd, and Ni.

Important features and advantages of the invention include the following:

1. Integration of combustion facilities with greenhouse gas—solidifying fertilizer production reactions— conversion of $CO_2$, CO, $SO_x$, and $NO_x$ emissions into carbonate-containing fertilizers (primarily, ammonium bicarbonate and urea);

2. Sequestration of $CO_2$ by enhanced carbonation of soil and subsoil terrains through the application of the carbonate-containing fertilizers;

3. Enhancement of photosynthetic fixation of $CO_2$ from the atmosphere by the technology-driven production of carbonate-containing fertilizers.

This invention utilizes waste heat from combustion facilities and converts various industrial waste gases, including $CO_2$, CO, $H_2$, $CH_4$, $N_2$, $NH_3$, $NO_x$, and $SO_x$, into commercial products, primarily fertilizers. It has the capability to solidify as much as 90% of the $CO_2$ from flue gas and place the carbonate-containing fertilizers into soil and subsoil earth layers, which at the same time can reduce $NO_3^-$ contamination of surface water and groundwater. Based on the current annual world consumption of nitrogen fertilizers, as much as 315 million tons of $CO_2$ per year from smokestacks could potentially be placed as bicarbonate into soil by worldwide use of this invention. In addition, this invention has the potential to remove CO, $SO_x$, and $NO_x$ emissions and to enhance photosynthetic fixation of $CO_2$ from the atmosphere. Therefore, the invention also has significant value in improving energy efficiency, enhancing economic competitiveness, and reducing environmental impacts of both the fossil energy system and the fertilizer industry.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
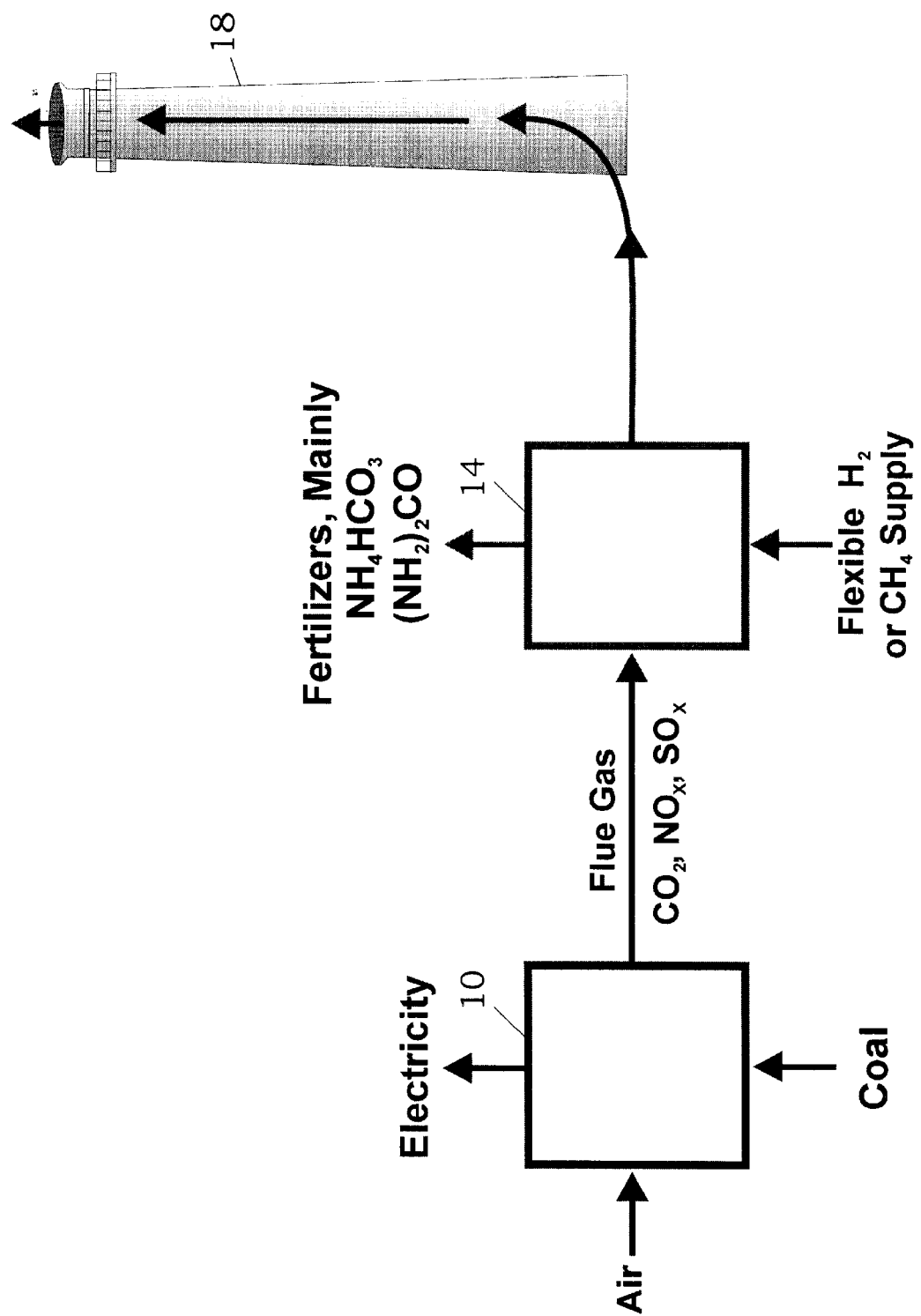
FIG. 1 is a schematic representation of the method of the invention: integration of industrial combustion facilities (such as a fossil fuel-fired power plant) with chemical engineering processes so that substantial quantities of $CO_2$, $SO_x$, and $NO_x$ can be converted into carbonate-containing fertilizers, mainly $NH_4HCO_3$ and $(NH_2)_2CO$.

The invention provides a method for reducing $CO_2$, CO, $NO_x$ and $SO_x$ emissions by converting these emissions into useful fertilizers. The invention can be applied to many combustion facilities that produce one or more of the following emissions: $CO_2$, CO, $NO_x$ and $SO_x$. In the preferred practice of this invention, combustion facilities are integrated with greenhouse gas-solidifying fertilizer production processes so that the gases are passed to a reactor before they can be emitted to the atmosphere and the waste heat from the combustion facilities can be utilized for the chemical engineering conversion processes. In the reactor, the emissions are converted into one or more of these compounds: $NH_4HCO_3$, $(NH_2)_2CO$, $NH_4NO_3$, and $(NH_4)_2SO_4$. Flue gas from combustion facilities typically contains about 15% $CO_2$ (v/v). According to the invention, $CO_2$ emission sources, such as from a fossil fuel-fired power plant 10, are directed to the reactor 14 prior to emission from the smokestack 18 (FIG. 1). In the reactor, flue-gas $CO_2$ is converted to $NH_4HCO_3$ using a fraction of $H_2$ or natural gas ($CH_4$) as in reaction (1):

$$5CO_2+4N_2+14H_2O+3CH_4 \rightarrow 8NH_4HCO_3 \downarrow \Delta_rG^\circ=-5.44 \text{ kJ/mol} \quad (1)$$

This reaction is more environmentally sound than the current ammonium nitrate production process, which emits three molecules of $CO_2$ for the same amount of nitrogen-valued fertilizer:

$$3CH_4+4N_2+2H_2O+8O_2 \rightarrow 4NH_4NO_3+3CO_2\uparrow \quad (2)$$

These two fertilizer production reactions use the same amount of natural gas ($3CH_4$) and produce the same nitrogen-fertilizer value since each has eight N atoms. However, the $NH_4HCO_3$ production reaction (1) does not emit any $CO_2$. Instead, it can solidify five net $CO_2$ molecules and thus has the potential to be used as an effective $CO_2$-removal process.

The free energy change for reaction (1) is −5.44 kJ/mol. The negative standard free energy change indicates that this reaction could occur spontaneously at ambient temperature and pressure. The use of catalysts will improve the reaction rate. Preferred catalysts include, but are not limited to, nanometer-structured and/or hybridized metallocatalysts of Ru, Os, W, Fe, Pt, Pd, and Ni.

When ammonia is available, $NH_4HCO_3$ can be simply manufactured by an ammonia carbonation reaction, which can occur at room temperature and ambient pressure:

$$CO_2+NH_3+H_2O \rightarrow NH_4HCO_3 \downarrow \Delta G^\circ=-18.05 \text{ kJ/mol} \quad (3)$$

The integration of combustion facilities with this $CO_2$-solidifying technology makes both ammonia ($NH_3$) and large quantities of cost-free $CO_2$ available so that large quantities of carbonate-containing fertilizers can be inexpensively produced. Calculations using published thermodynamic data showed that the standard free energy change ($\Delta G^\circ$) for reaction (3) is −18.05 kJ/mol, which indicates that this carbonation reaction is favored thermodynamically. The thermodynamic equilibrium constant (K) is 1459 for this ammonia carbonation reaction. Consequently, this reaction can serve as an effective scrubbing process to remove as much as 90% of the $CO_2$ from the flue gas and produce a valuable product ($NH_4HCO_3$).

With addition of ammonia, ammonium bicarbonate can be optionally converted into urea at about 150° C.:

$$NH_3+NH_4HCO_3 \rightarrow (NH_2)_2CO+2H_2O \quad (4)$$

If necessary, this process reaction may also be achieved by the use of the waste heat from the power plants, because the temperature of a typical flue gas is close to 150° C.

The conversion of $CO_2$ emissions into $NH_4HCO_3$ and $(NH_2)_2CO$ can also be achieved by the use of $H_2$ or CO through the following reactions (5–7):

$$2CO_2+N_2+3H_2+2H_2O \rightarrow 2NH_4HCO_3\downarrow \Delta_rG^o=-86.18 \text{ kJ/mol} \quad (5)$$

$$CO_2+N_2+3H_2 \rightarrow (NH_2)_2CO\downarrow +H_2O \Delta_rG^o=-31.34 \text{ kJ/mol} \quad (6)$$

$$3CO+N_2+5H_2O \rightarrow 2NH_4HCO_3\downarrow +CO_2 \Delta_rG^o=-171.98 \text{ kJ/mol} \quad (7)$$

The $NH_4HCO_3$ production reaction (5) indicates that the use of three $H_2$ molecules can fix two $CO_2$ molecules to produce two molecules of fertilizer. The use of three $H_2$ molecules in reaction (6) can fix one $CO_2$ molecule. Therefore, $CO_2$ solidification by $NH_4HCO_3$ production is twice as effective as that of $(NH_2)_2CO$ production. Reaction (1) indicates that the use of three $CH_4$ molecules can fix five $CO_2$ molecules, producing eight $NH_4HCO_3$ molecules. The urea production reaction (8) can fix only one $CO_2$ molecule using the same number of $CH_4$ molecules:

$$CO_2+4N_2+2H_2O+3CH_4 \rightarrow 4(NH_2)CO_2 \quad (8)$$

When $CH_4$ is used, therefore, $CO_2$ solidification by $NH_4HCO_3$ production is 5 times that of the urea production reaction (8).

Figure 2:
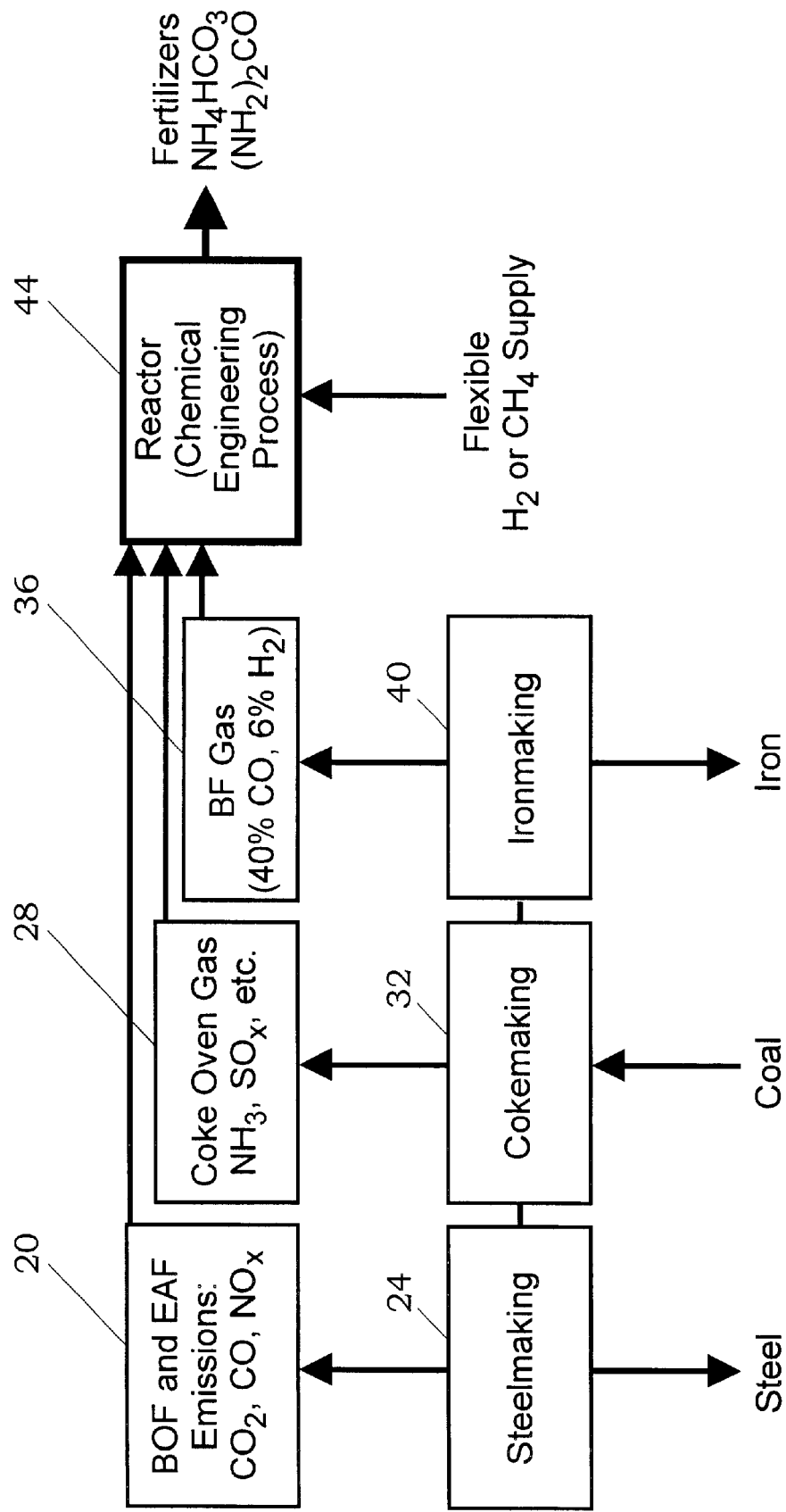
FIG. 2 is a schematic representation of some significant industrial applications of the invention: substantially simultaneous and/or selective removal of $CO_2$, CO, $SO_x$, and $NO_x$ emissions at an iron and steelmaking plant.

Since these process reactions all have a negative value of $\Delta_rG^o$, thermodynamically they should be able to occur spontaneously at ambient temperature and pressure and are useful to treat certain industrial waste gases that contain significant amounts of $H_2$ and/or CO. For example, the iron and steelmaking industry has an $H_2$-rich flue gas known as blast furnace (BF) gas, which contains about 40% CO and 6% $H_2$ that are perfect to be used as an $H_2$ source to remove $CO_2$, CO, $SO_x$, and $NO_x$ emissions by the invention (FIG. 2). Basic oxygen furnace (BOF) and electric arc furnace (EAF) emissions 20 from a steelmaking process 24, coke oven gas 28 from a cokemaking process 32, and BF gas 36 from an ironmaking process 40 can all be processed in a reactor 44 to produce fertilizers according to the invention. The U.S. iron and steelmaking industry emits about 889,000 tons of CO per year from its sinter plant windboxes and BOFs. By use of reaction (7), CO emissions can be converted into a valuable fertilizer and 66% of the $CO_2$ derived from CO could be solidified into $NH_4HCO_3$.

Simultaneous, selective, and/or total removal of $SO_x$, $NO_x$, CO, and $CO_2$ emissions is possible by using the method described in the invention. Flue gas of many combustion facilities also contains significant amounts of $NO_x$ and $SO_x$ emissions at ppm levels, which could contribute to acid rain and cause environmental damage. As illustrated in FIGS. 1 and 2, this invention is also useful for removing $NO_x$ and $SO_x$ emissions. By use of proper catalysts, $NO_x$ and $SO_x$ can be converted into $HNO_3$ and $H_2SO_4$. The preferred catalysts for these conversion processes are platinum and nickel. The acid species generated from the conversion processes can then be removed by an acid-base reaction with $NH_3$, an intermediate of the proposed $NH_4HCO_3$ and $(NH_2)_2CO$ production process, to form additional fertilizer species, $NH_4NO_3$ and $(NH_4)_2SO_4$. Therefore, the invention is capable of simultaneous, selective, and/or total removal of $SO_x$, $NO_x$, CO, and $CO_2$ emissions. The $H_2$ and $CH_4$ used in the invention can be obtained from many suitable sources. The $H_2$ can be generated by photosynthetic and solar photovoltaic water splitting, in addition to steam reforming of $CH_4$, CO, and fuel including coal. Sources of $CH_4$ include natural gas, fermentation of biomass, methane hydrates from oceans, and gasification of fossil fuels. When $NH_3$ is available, it may be employed directly in the invention for removal of the emissions.

Figure 3:
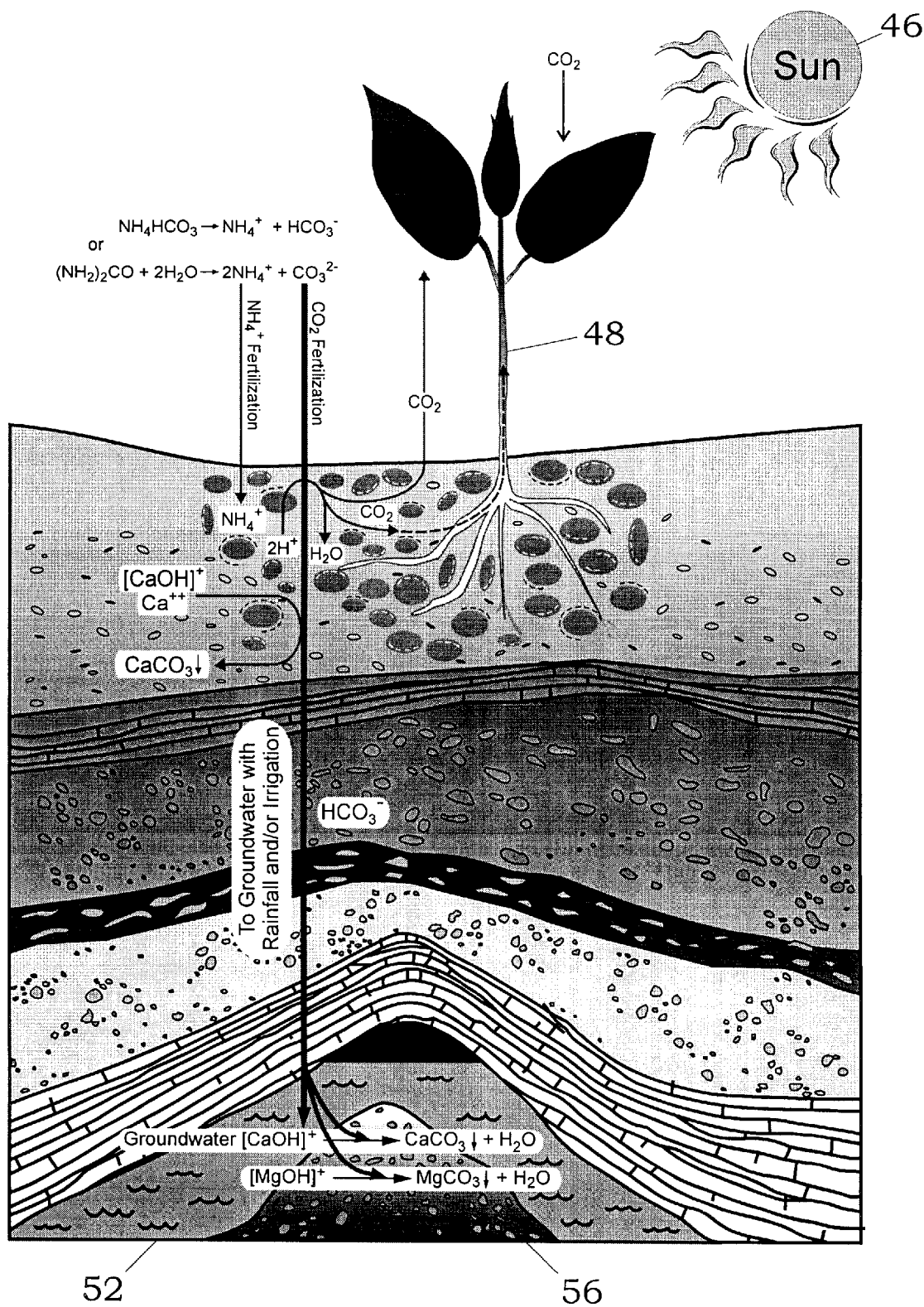
FIG. 3 is a schematic representation of the sequestration of $CO_2$ into soil, groundwater, the earth subsurface, and plant biomass by the application of carbonate-containing fertilizers according to the invention.

Enhanced carbonation of soil, groundwater, and the subsoil earth layers by application of carbonate-containing fertilizers is also possible by the method of the invention. It is known that carbonates can react with alkaline earth minerals such as calcium and magnesium and can be deposited as carbonated minerals. For example, in alkaline soils such as those in the western United States (with pH values above 7), which may contain high levels of alkaline salts such as $[Ca(OH)]^+$, typically from the rising or cumulative use of groundwater, the bicarbonate $HCO_3^-$ from $NH_4HCO_3$ can neutralize alkaline species and reduce salt content by forming stable species like water and calcium carbonate [reaction (9)]. Solid products like $CaCO_3$ are a stable form of sequestered $CO_2$ (FIG. 3).

$$HCO_3^-+[Ca(OH)]^+ \rightarrow H_2O+CaCO_3\downarrow \quad (9)$$

Furthermore, carbonation of earth minerals such as calcium can occur also in acidic soils (pH 4–6), according to the following reaction:

$$Ca^{2+}+2HCO_3^- \rightarrow CaCO_3\downarrow +(H_2CO_3)aq \quad (10)$$

In this reaction, half of the bicarbonate may be sequestered as solid $CaCO_3$. The other half ($H_2CO_3$) could remain in the aqueous phase if the carbonate concentration is below its maximal solubility in water (about 40 mM) and move with soil water into subsoil earth layers. In agricultural practice, the required concentration of nitrogen fertilizer (such as $NH_4HCO_3$) in soil solution is approximately 10 mM, which is equivalent to about 50 kg N per hectare. Water can physically hold a maximum of about 40 mM of aqueous $CO_2$ at ambient temperature and pressure before a gas phase of $CO_2$ is formed. The maximal solubility of $CO_2$ in water is 39.28 mM at 20° C., although natural rainfall or air-equilibrated water contains as little as 0.014 mM of dissolved $CO_2$. Application of earth mineral-rich materials (such as calcium and magnesium fertilizers, mineral products, or fly ash) in conjunction with $NH_4HCO_3$ into deep soil is preferred to enhance storage (sequestration) of inorganic carbon, especially in acidic soils (pH 4–6) such as those in the eastern United States.

In acidic soils, use of $NH_4HCO_3$ and $(NH_2)_2CO$ can provide bicarbonates, such as $HCO_3^-$ and $CO_3^{2-}$, to improve soil properties by neutralizing protons according to reaction (11):

$$HCO_3^-+H^+ \rightarrow H_2O+CO_2\uparrow \quad (11)$$

Because $CO_2$ is generally heavier than air, its release from soil in the field microenvironment can beneficially enrich the $CO_2$ supply for photosynthesis, which occurs in green plants 48 using light energy 46 (FIG. 3). In pH-neutral soils, all of the $CO_2$ storage reactions (9 and 10) and the protonation reaction (11) are possible.

Agricultural use of the carbonate-containing fertilizer ($NH_4HCO_3$) essentially disperses the carbonates in a diluted fashion (at about 10 mM concentration levels, equivalents to 50 kg N per hectare) into the soils over a vast land area. Natural rainfall and/or irrigation could then bring the carbonates down into groundwater and the earth subsurface—a potentially huge underground reservoir for $CO_2$ sequestration. To accelerate the transfer of carbonates into the subsoil earth layers, it is preferred to place the carbonate-containing fertilizers into deep soil before rain and/or irrigation.

Figure 4:
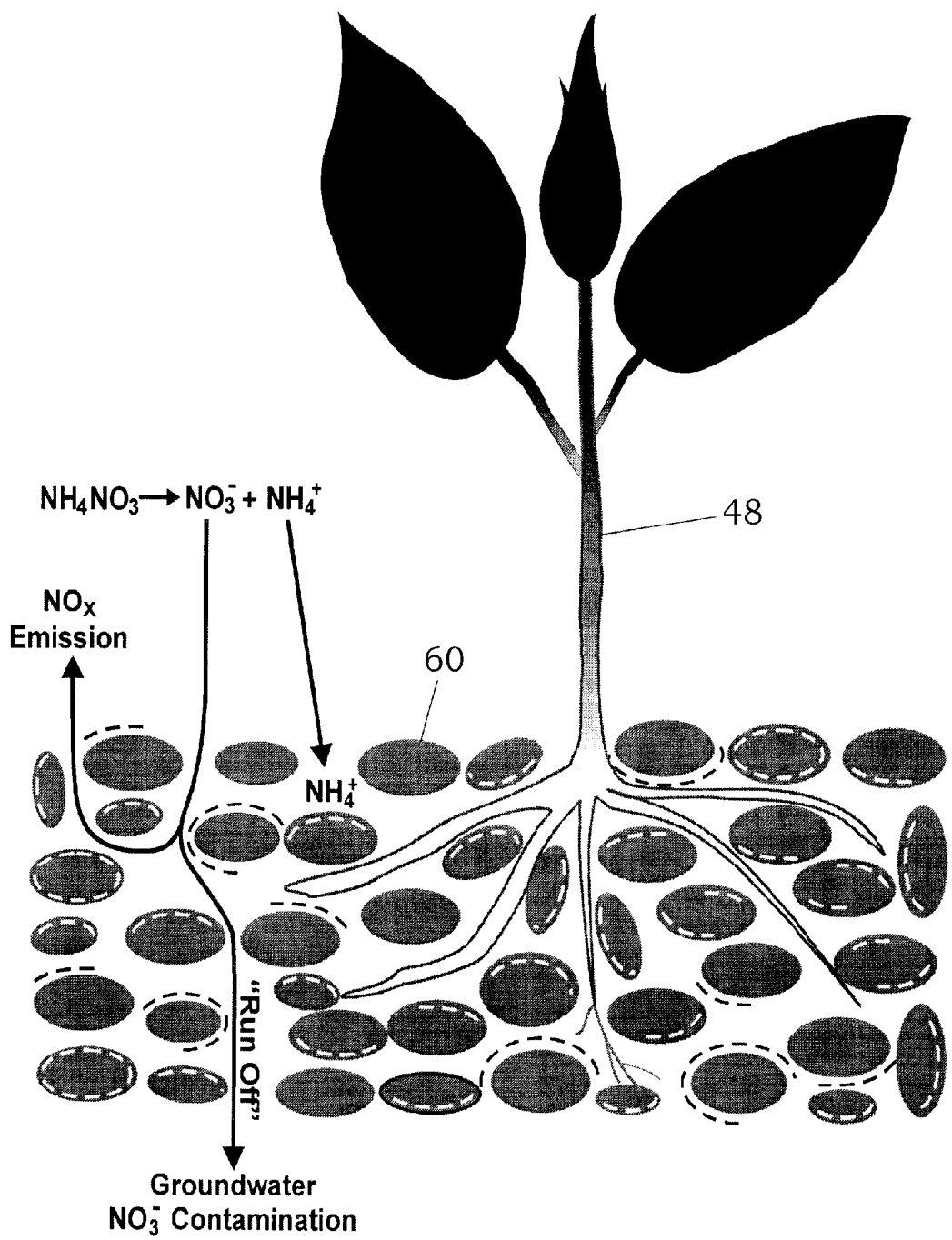
FIG. 4 illustrates $NO_3^-$ runoff and $NO_x$ emission caused by the current use of ammonium nitrate ($NH_4NO_3$) as a fertilizer.

The invention also employs soil as a "smart" screening material that will retain $NH_4^+$ but allow $HCO_3^-$ to percolate with natural rainfall and/or irrigation down into groundwater, which is often rich in alkaline mineral species such as $[Ca(OH)]^+$. Therefore, the carbonates could potentially react with the alkaline species in groundwater 52 and be deposited as carbonated minerals in the subsoil earth layers 56 (FIG. 3). The reason that soils commonly have much higher retaining affinity for positively charged ions such as $NH_4^+$ than for negatively charged species such as $HCO_3^-$ is that soil particles carry mostly negative surface charges, which attract positively charged ions but repel negatively charged species. Therefore, when $NH_4HCO_3$ is placed into soil, only its $NH_4^+$ can bind with soil by replacing other cations such as $Na^+$ and $H^+$ on the soil particles—leaving free $HCO_3^-$ and the exchanged cations ($Na^+$, $H^+$, etc.) in mobile water that could go down into subsoil earth layers. For this reason, when $NH_4NO_3$ is used as a fertilizer, its $NO_3^-$ can easily "run off" with water from soils 60, resulting in not only the loss of the fertilizer but also the $NO_3^-$ contamination of groundwater (FIG. 4). However, if $NH_4HCO_3$ and $(NH_2)_2CO$ (which contain no nitrate but instead harmless carbonates) are used as fertilizers, the result can be very different—and potentially beneficial. Unlike $NO_3^-$, carbonates (e.g., $CO_3^{2-}$ and $HCO_3^-$) are harmless species, and carbonated groundwater would not cause health problems.

Movement of groundwater can carry carbonates further down to the earth subsurface as deep as 500 to over 1000 meters, where they can be deposited by the carbonation reaction with minerals (FIG. 3). More importantly, in many geological areas, the residence time of groundwater 52 could be on the order of hundreds, even thousands, of years. Once the carbonates from the fertilizers enter this type of groundwater, they would not return to the atmosphere for hundreds of years even if they are not deposited as carbonated minerals and remain as free carbonates in the groundwater. Therefore, this groundwater-mediated $CO_2$ sequestration could potentially occur in essentially all land areas, including those with neutral and slightly acidic soils, as long as the carbonates can effectively percolate from soil with rainfalls and/or irrigation down into groundwater. The application of cations, such as $Na^+$, and earth mineral-rich materials, such as calcium and magnesium fertilizers or fly ash, in conjunction with carbonate-containing fertilizers into deep soil is also the preferred practice to enhance the transfer of carbonates from soil into groundwater and the subsoil earth layers. Since this carbon deposition occurs in a diluted manner and covers a vast land area, the underground reservoir will probably not be saturated by this carbonation process for the next 100 years. Consequently, it is possible to use this invention, $CO_2$-solidifying fertilizer production and its product application with soil-groundwater-mediated sequestration of $CO_2$, for at least 100 years.

Photosynthetic fixation of $CO_2$ from the atmosphere is enhanced by the production of $NH_4HCO_3$ and $(NH_2)_2CO$, according to the invention. Both $NH_4HCO_3$ and $(NH_2)_2CO$ are water soluble and can provide nitrogen ($NH_4^+$) and $CO_2$ fertilization for plant photosynthesis. It has been demonstrated that with deep placement, the fertilization effect of $NH_4HCO_3$ on crops is similar to that of urea. When $NH_4HCO_3$ is dissolved in water, it forms ammonium ion and bicarbonate. Both are good plant foods that are immediately available for utilization:

$$NH_4HCO_3 \rightarrow NH_4^+ + HCO_3^- \qquad (12)$$

When $(NH_2)_2CO$ is applied to soils, soil microorganisms will convert it into ammonium ions and carbonate:

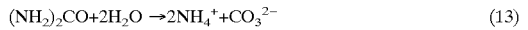

$$(NH_2)_2CO + 2H_2O \rightarrow 2NH_4^+ + CO_3^{2-} \qquad (13)$$

Soils commonly have strong binding affinity for ammonium ion ($NH_4^+$), which prevents its loss. At the same time, $NH_4^+$ can be absorbed directly by plants, primarily through their root system, for synthesis of amino acids, chlorophylls, etc. Since nitrogen fertilizer generally allows photosynthetic organisms to synthesize more "green machines" (photosynthetic reaction centers and enzymes), supplying $NH_4HCO_3$ and $(NH_2)_2CO$ to crops not only sends the solidified $CO_2$ into the field, where it is supposed to be, but also "catalyzes" plant photosynthesis to fix many additional molecules of $CO_2$ from the atmosphere. Use of nitrogen fertilizer can typically produce about 50 kg dry biomass/1 kg N through plant photosynthesis. In the case of $NH_4HCO_3$, this is equivalent to 23.3 molecules of $CO_2$ sequestered in biomass per molecule of $NH_4HCO_3$ used. Production of one molecule of $NH_4HCO_3$ requires only 3/8 molecule of $CH_4$. Therefore, input of one $CH_4$ molecule through the use of this invention could result in sequestration of approximately 62 molecules of $CO_2$ by photosynthetic biomass production. Fertilization of trees could be an important option to enhance photosynthetic sequestration of $CO_2$. Wood has a C:N ratio of about 140:1 and is a more stable form of biomass. With a moderate fertilization efficiency (e.g., 60%), input of 1 $NH_4^+$ molecule through tree fertilization could result in sequestration of 84 molecules of $CO_2$ into wood. If the increased quantity of nitrogen fertilizer (100–80=20 million tons of N per year) from the worldwide use of this invention is employed to fertilize trees (with 60% efficiency), 20 million tons of N could translate into 5280 million tons of $CO_2$ being sequestered into wood, which is equivalent to a 24% reduction of $CO_2$ emissions from the current world consumption of all fossil fuels. Therefore, fertilization of trees is a preferred practice in this aspect of the invention.

Figure 5:
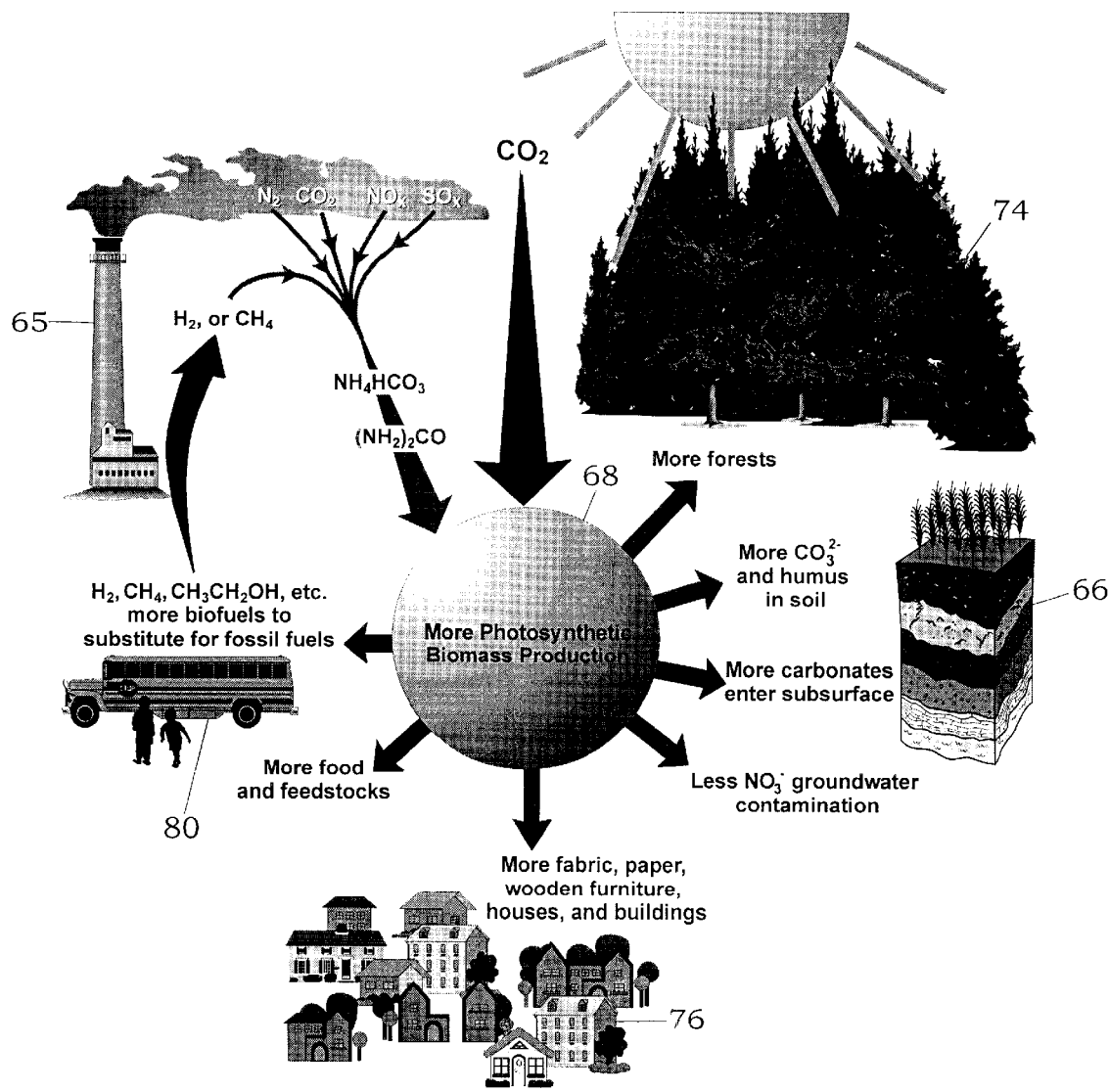
FIG. 5 summarizes the expected benefits from the use of the invention and illustrates the concept of global reduction of $CO_2$, CO, $SO_x$, and $NO_x$ emissions according to the invention.

The expected benefits from the use of this invention are summarized in FIG. 5. The greenhouse gas-solidifying chemical engineering process uses components mostly from flue gas, air, and water, which are inexpensive and virtually inexhaustible. It produces no toxic materials but valuable commercial products (mainly, $NH_4HCO_3$ and $(NH_2)_2CO$) which can be sold to a worldwide market. This invention will enable the industrial combustion facilities 65 to remove greenhouse-gas emissions (to satisfy U.S. Environmental Protection Agency requirements) and produce valuable products that can be sold to farmers, making a profit. The current industrial price of quality natural gas (containing over 90% $CH_4$) is \$3.47/1000 $ft^3$ in the United States. Therefore, utilization of \$28.38 of $CH_4$ can convert 1000 kg of $CO_2$ to 1800 kg of $NH_4HCO_3$ according to reaction (1). For its nitrogen value alone, 1800 kg of $NH_4HCO_3$ should sell for at least \$159.30. Farmers need fertilizers to grow crops, and the growing world population needs agricultural products including foods, cotton, and woody products. Therefore, the use of this invention—from solidification of industrial $CO_2$ emission into carbonate-containing fertilizers to the application of the carbonate-containing fertilizers to enhance sequestration of $CO_2$ into soil and subsoil terrains 66 and to stimulate photosynthetic fixation of $CO_2$ 68 from the atmosphere—can occur spontaneously with its natural social economic force. That is, the operation of the invented concept and process technology should not require a net expenditure to perform. Therefore, by use of this technology, removal of greenhouse-gas emissions could be achieved essentially without governmental (or public) expenditure.

Consequently, this invention is preferred over alternatives such as injection of $CO_2$ into the bottom of oceans, a concept that would require tax dollars to implement even if such an injection technology could be developed. Further, the invention prevents the proliferation of dangerous $NH_4NO_3$ fertilizers, which are currently used by terrorists to make bombs.

As described above, use of the invention can enhance photosynthetic production of biomass 68. A richer volume of global biomass also results in more foods and feedstocks; more milk and animals; more cotton and silk for clothing; and more trees 74, paper and woody products including wooden furniture, houses, and buildings 76. All of these are perfectly sequestered forms of $CO_2$ and free of the greenhouse effect. Some of them, such as cotton and silk clothing, papers, wooden furniture, houses, and other structures, can remain for tens and even hundreds of years, maintaining their useful functions for human society (FIG. 5). Some biomass can be used as a renewable biomass energy source 80 to substitute for fossil fuels. Current biochemical engineering technology can convert biomass such as sugar and/or grain starch to ethanol. All plant materials, including stalks, straws, roots, and leaves, can be fermented to produce methane, an important gaseous fuel and feedstock, which is also useful in the invention. The residue of biomass fermentation is largely humus, which is a stable organic carbon material that can be used as a valuable additive to improve soil quality. Humus is not readily digested by microorganisms. Consequently, the lifetime of humus in soil is much longer than that of other biomass in soil. Addition of humus not only improves soil quality, such as the ability to retain water and nutrients, but also can serve as a means of carbon storage for global $CO_2$ sequestration. In conclusion, use of the invention can transform many industrial greenhouse-gas emitters into a productive system that can be operated in harmony with the environment—producing economic wealth and at the same time contributing positively toward global sequestration of $CO_2$ and protection of clean air and water resources.

The invention can be used in a number of industrial combustion facilities.

These include, but are not limited to, fossil fuel-fired power plants, biomass-fired power plants, fossil fuel-powered manufacturing plants, steam plants, petroleum and gas refinery plants, gas flaring facilities, incinerators, cement manufacturing plants, aluminum-making plants, coke-making plants, iron-making plants, and steelmaking plants.

The invention can take other forms and embodiments without departing from the essential attributes thereof, and accordingly, reference should be made to the following claims, rather than to the foregoing specification, as indicating the scope of the invention.

What is claimed is:

1. A method for reducing the emissions of industrial combustion facilities, comprising the steps of:

collecting emissions from said industrial combustion facilities, reacting said emissions to form at least carbonate-containing fertilizers, wherein said emissions are reacted to produce $NH_4HCO_3$ fertilizer according to the formula:

$$2CO_2+N_2+3H_2+2H_2O \rightarrow 2NH_4HCO_3\downarrow;$$

and applying at least a portion of said fertilizer to soil and plants.

2. A method for reducing the emissions of industrial combustion facilities, comprising the steps of:

collecting emissions from said industrial combustion facilities, reacting said emissions to form at least carbonate-containing fertilizers, wherein said emissions are reacted to produce $NH_4HCO_3$ fertilizer according to the formula:

$$5CO_2+4N_2+14H_2O+3CH_4 \rightarrow 8NH_4HCO_3\downarrow;$$

and applying at least a portion of said fertilizer to soil and plants.

3. A method for reducing the emissions of industrial combustion facilities, comprising the steps of:

collecting emissions from said industrial combustion facilities, reacting said emissions to form at least carbon-containing fertilizers, wherein said emissions are reacted to produce $(NH_2)_2CO$ fertilizer according to the formula:

$$CO_2+N_2+3H_2 \rightarrow (NH_2)_2CO\downarrow+H_2O;$$

and applying at least a portion of said fertilizer to soil and plants.

4. A method for reducing the emissions of industrial combustion facilities, comprising the steps of:

collecting emissions from said industrial combustion facilities, reacting said emissions to form at least carbon-containing fertilizers, wherein said emissions are reacted to produce $(NH_2)_2CO$ fertilizer according to the formula:

$$CO_2+4N_2+2H_2O+3CH_4 \rightarrow 4(NH_2)_2CO\downarrow;$$

and applying at least a portion of said fertilizer to soil and plants.

5. A method for reducing the emissions of industrial combustion facilities, comprising the steps of:

collecting emissions from said industrial combustion facilities, reacting said emissions to form at least carbonate-containing fertilizers, wherein said emissions are reacted according to the following reaction pathway:

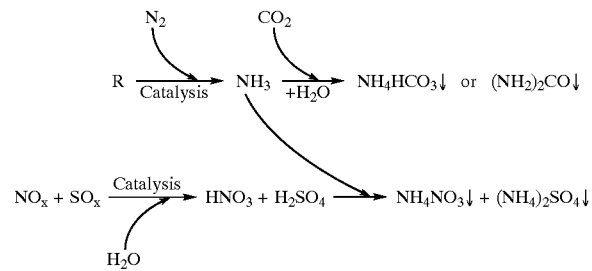

wherein R is at least one selected from the group consisting of $H_2$ and $CH_4$; $NO_x$ is at least one selected from the group consisting of $NO$, $NO_2$, $N_2O$, $N_2O_3$ and $N_2O_4$; and $SO_x$ is at least one selected from the group consisting of $SO_2$ and $SO_3$, and applying at least a portion of said fertilizers to soil and plants.

6. A method for reducing the emissions of industrial combustion facilities, comprising the steps of:

collecting emissions from said industrial combustion facilities, reacting said emissions to form at least carbonate-containing fertilizers, and applying at least a portion of said fertilizers to soil and plants, wherein said fertilizers are applied in conjunction with application of at least one selected from the group consisting of calcium and magnesium fertilizers, mineral products, and fly ash to soils to enhance the formation of earth mineral carbonates according to at least one of the formulas selected from the group consisting of:

$$HCO_3^- + [Ca(OH)]^+ \rightarrow H_2O + CaCO_3\downarrow$$

$$Ca^{2+} + 2HCO_3^- \rightarrow CaCO_3\downarrow + (H_2CO_3)aq$$

$$HCO_3^- + [Mg(OH)]^+ \rightarrow H_2O + MgCO_3\downarrow$$

$$Mg^{2+} + 2HCO_3^- \rightarrow MgCO_3\downarrow + (H_2CO_3)aq.$$

7. A method for reducing the emissions of industrial combustion facilities, comprising the steps of:

collecting emissions from said industrial combustion facilities, reacting said emissions to form at least carbonate-containing fertilizers, and applying at least a portion of said fertilizers to soil and plants, wherein said fertilizers are applied to soils and water is then applied to bring the carbonates down into groundwater and subsoil earth layers, the carbonates being deposited at the earth subsurface by carbonation reaction with earth minerals according to at least one of the formulas selected from the group consisting of:

$$HCO_3^- + [Mg(OH)]^+ \rightarrow H_2O + MgCO_3\downarrow$$

$$Mg^{2+} + 2HCO_3^- \rightarrow MgCO_3\downarrow + (H_2CO_3)aq$$

$$HCO_3^- + [Ca(OH)]^+ \rightarrow H_2O + CaCO_3\downarrow$$

$$Ca^{2+} + 2HCO_3^- \rightarrow CaCO_3\downarrow + (H_2CO_3)aq.$$

* * * * *